United States Patent [19]

Borre, Jr.

[11] Patent Number: 5,046,306
[45] Date of Patent: Sep. 10, 1991

[54] SECONDARY OIL SYSTEM

[75] Inventor: Ronald J. Borre, Jr., Indianapolis, Ind.

[73] Assignee: General Motors Corporation, Detroit, Mich.

[21] Appl. No.: 556,689

[22] Filed: Jul. 23, 1990

[51] Int. Cl.⁵ .......................... F01M 1/18; F02C 7/06
[52] U.S. Cl. .................................. 60/39.08; 184/6.11; 415/175
[58] Field of Search ............... 60/39.08; 417/175, 176; 184/6.11

[56] References Cited

U.S. PATENT DOCUMENTS

| | | | |
|---|---|---|---|
| 3,779,345 | 12/1973 | Bernes et al. | 184/6.4 |
| 4,284,174 | 8/1981 | Salvana et al. | 184/6.4 |
| 4,717,000 | 1/1988 | Waddington et al. | 184/61 |
| 4,741,155 | 5/1988 | McCarty | 60/39.08 |
| 4,858,426 | 8/1989 | Holcomb | 184/6.11 |
| 4,858,427 | 8/1989 | Provenzano | 184/6.11 |
| 4,888,947 | 12/1989 | Thompson | 60/39.08 |
| 4,917,218 | 4/1990 | Murray | 60/39.08 |

Primary Examiner—Louis J. Casaregola
Assistant Examiner—Laleh Jalali
Attorney, Agent, or Firm—Saul Schwartz

[57] ABSTRACT

A secondary oil system for a gas turbine engine includes a reservoir in a bearing sump of the engine and a mist tube extending across the top of the reservoir and connected at one end to a compressed air source and at the other end to a nozzle in a bearing sump. A shut-off valve responsive to primary system oil pressure normally blocks the mist tube but unblocks the latter when primary system pressure is low. The compressed air pressurizes the reservoir when the shut-off valve is open and forces oil through a pick-up tube to another orifice in the mist tube located at a venturi passage. Oil issuing into the mist tube mixes with high velocity air in the venturi passage to form a mist which is conducted by the mist tube to the nozzle from which it is directed at a rotor shaft bearing. The orifice at the venturi passage is at a lower elevation than the pressurizing orifice relative to the bottom of the reservoir and defines the normally filled oil level in the reservoir.

4 Claims, 3 Drawing Sheets

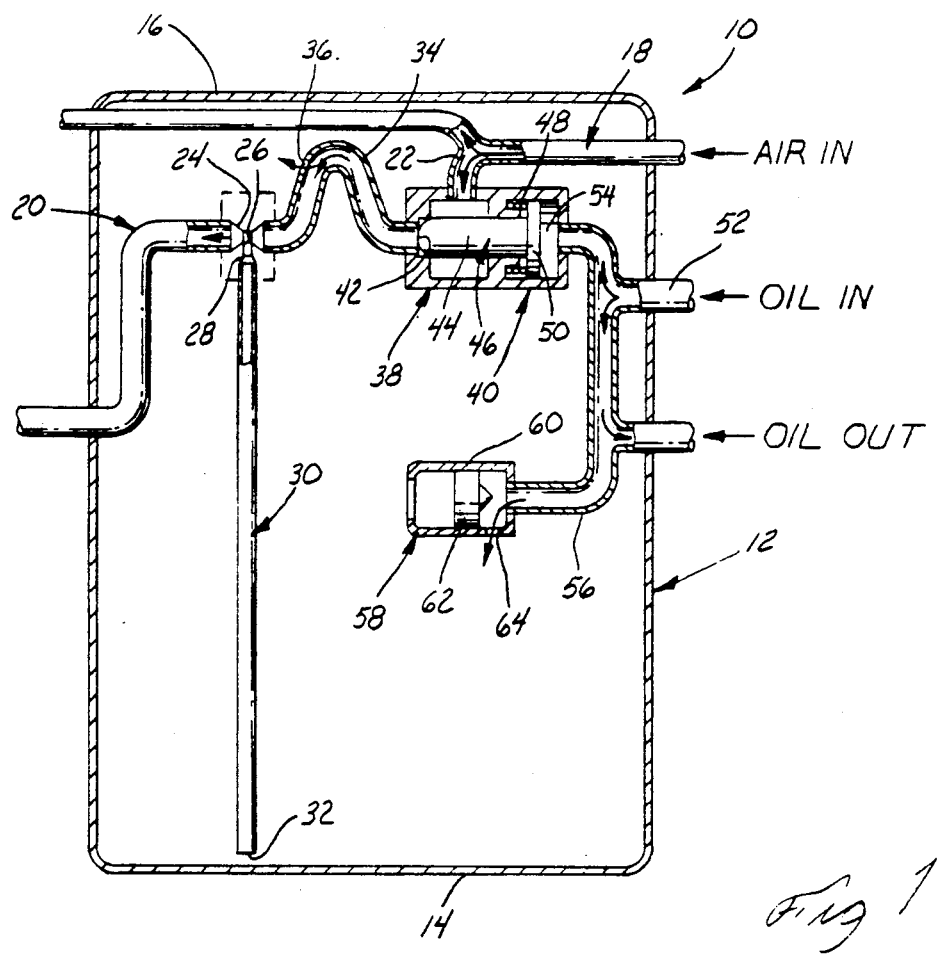
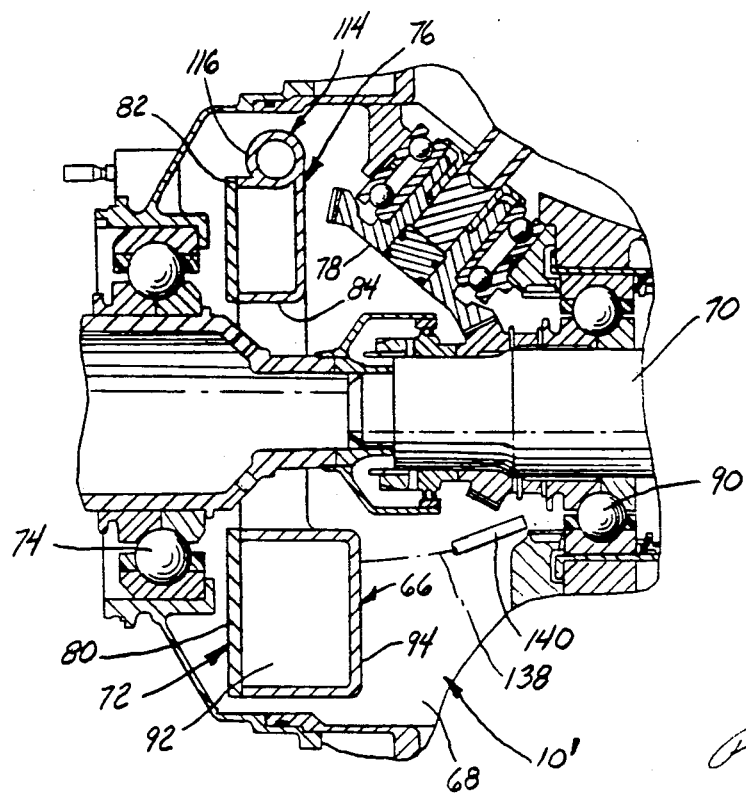
Fig. 1
Fig. 2

SECONDARY OIL SYSTEM

This invention was made in the course of work under a contract or subcontract with the U.S. Department of Defense.

FIELD OF THE INVENTION

This invention relates to secondary oil systems for aircraft propulsion gas turbine engines.

BACKGROUND OF THE INVENTION

For the purpose of providing limited flight capability after loss of oil pressure in a flight propulsion gas turbine engine, secondary oil systems have been proposed which release reserve oil supplies in response to loss or substantial reduction of oil pressure in a primary or main oil system of the engine. Also, secondary oil systems have been proposed in which reserve oil is dispersed as a mist to maximize lubrication and cooling. A secondary oil system according to this invention is a misting-type system having a particularly simple, self-contained structure for maximum reliability and minimum cost and weight.

SUMMARY OF THE INVENTION

This invention is a new and improved secondary oil system particularly for a flight propulsion gas turbine engine on an aircraft. The secondary oil system according to this invention includes a reservoir located in a bearing sump of the engine and filled with oil from the primary oil system when the primary system is active, a mist tube traversing the reservoir between a junction with a source of compressed air and a nozzle in the sump, a first orifice in the mist tube at a first elevation above the bottom of the reservoir, and a shut-off valve between the first orifice and the compressed air junction. When the primary oil system is active, the shut-off valve closes the mist tube and oil spills out of the reservoir through the first orifice so that the latter defines the normally filled oil level in the reservoir. The secondary oil system according to this invention further includes a second orifice in the mist tube at an elevation relative to the bottom of the reservoir above the first orifice and open to the interior of the reservoir, a venturi passage at the first orifice, and a check valve between the reservoir inlet and the primary oil system. When primary oil pressure is low, the shut-off valve opens and compressed air is admitted to the mist tube. The compressed air in the mist tube pressurizes the reservoir through the second orifice and mixes with oil from the first orifice at the venturi passage so that a mist is formed and transported by the mist tube to the nozzle. The nozzle directs a jet of the air/oil mist at the bearing for secondary lubrication and cooling.

BRIEF DESCRIPTION OF THE DRAWINGS

FIG. 1 is a schematic representation of the secondary oil system according to this invention;

FIG. 2 is a fragmentary elevational view of a bearing sump of an aircraft flight propulsion gas turbine engine having a secondary oil system according to this invention;

DESCRIPTION OF A PREFERRED EMBODIMENT

Figure 3:
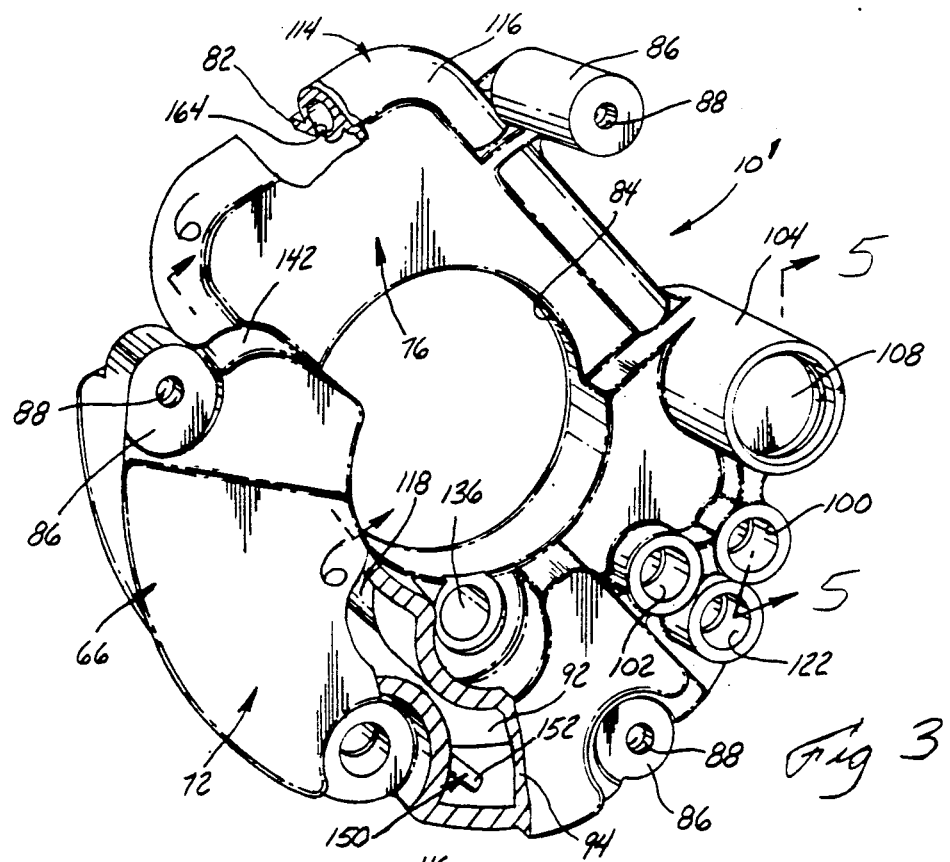
FIG. 3 is a partially broken-away perspective view of a first side of a secondary oil system according to this invention.

FIG. 1 is a schematic representation of a secondary oil system 10 according to this invention for a flight propulsion gas turbine engine on an aircraft. The secondary oil system includes a tank or reservoir 12 ideally located in a bearing sump near a bearing of the engine which is normally lubricated by the primary oil system of the engine and which, for the engine to sustain flight propulsion, requires secondary lubrication when primary lubrication is interrupted. The reservoir 12 is illustrated in an upright position corresponding to level flight of the aircraft and includes bottom 14 and a top 16. A duct 18 of the engine carries compressed air from a compressor of the engine, not shown, to a remote location and is representative of any convenient source of compressed air on the engine.

The secondary oil system 10 further includes a mist tube 20 which traverses the reservoir near the top 16. A first end of the mist tube merges with the compressed air duct 18 at a compressed air junction 22. A second end, not shown, of the mist tube 20 is connected to a nozzle in a sump of the engine near a bearing for which secondary lubrication is required.

The mist tube 20 has a restriction or venturi passage 24 therein and a first orifice 26 at the smallest diameter or throat of the venturi passage. The first orifice 26 affords communication between the venturi passage 24 and an upper end 28 of a pick-up tube 30. A lower end 32 of the pick-up tube is located near the bottom 14 of the reservoir. The mist tube has an arch 34 upstream of the first orifice 26, i.e. between the first orifice and the compressed air junction 22. A second orifice 36 in the mist tube is located on the downstream side of the arch 34 relative to the compressed air junction 22 and affords communication between the mist tube and the reservoir 12. The elevation of the nozzle is lower relative to the bottom 14 of the reservoir than the first orifice 26.

The mist tube 20 traverses a housing 38 of a shut-off valve 40 of the secondary oil system. The housing 38 has a seat 42 which receives a plunger 44 of a valve element 46 in a closed condition of the shut-off valve. The mist tube is blocked by the plunger 44 in the closed condition of the shut-off valve. A spring 48 bears against a piston head 50 of the valve element and urges the plunger away from the seat 42. Separation of the plunger 44 from the seat 42 corresponds to an open condition of the shut-off valve wherein compressed air is admitted to the mist tube 20 from the duct 18.

A duct 52 of the primary oil system of the engine which loops through the reservoir is connected to a chamber 54 in the housing 38 of the shut-off valve on the opposite side of the piston head 50 from the spring 48. When the engine is operating and the primary oil system is active, normal primary system oil pressure in the chamber 54 overcomes the spring 48 and maintains the shut-off valve in the closed condition. When the engine is not operating or the condition of the primary oil system is impaired to the extent that primary system oil pressure is low, the spring 48 actuates the shut-off valve to the open condition.

A branch 56 of the duct 52 conducts primary system oil to an inlet check valve 58 having a housing 60 and a spool 62 slidable in the housing between an open position exposing an inlet orifice 64 in the housing and a closed position covering the inlet orifice. The spool 62 is exposed on one side to primary system oil pressure and on the other side to the pressure prevailing in the reservoir 12. When primary system oil pressure exceeds reservoir pressure, the spool 62 is in the open position and oil from the primary system fills the reservoir through the inlet orifice 64. When reservoir pressure exceeds primary system oil pressure, the spool is in the closed position preventing backflow of oil from the reservoir into the branch 56.

The size of the inlet orifice 64 is coordinated with the size of the first orifice 26 such that when the primary oil system is active in normal fashion, oil spills from the reservoir through first orifice at the same rate that oil enters the reservoir through the inlet orifice. The elevation of the first orifice thus establishes the normal oil level in the reservoir. Oil spilling from first orifice drips into the bearing sump through the mist tube and is scavenged in the usual way. The peak of the arch 34 is above the first orifice to minimize the likelihood of oil collecting in the mist tube 20 near the shut-off valve 40.

If primary system oil pressure becomes abnormally low while the engine is operating, the spring 48 actuates the shut-off valve to the open condition admitting compressed air to the mist tube 20. Compressed air flows through the mist tube to the nozzle at the second end of the latter. At the same time, the reservoir 12 is pressurized by compressed air through the second orifice 36. The pressure in the reservoir shifts the spool 62 in the inlet check valve 58 to the closed position and forces oil up through the pick-up tube and the first orifice 26 into the mist tube. The oil from the reservoir mixes with the compressed air in the mist tube to form an air/oil mist which is conducted by the mist tube to the nozzle and then directed at the bearing to sustain the latter until the reservoir 12 is drained.

A physical realization 10, of the secondary oil system 10 is illustrated in FIGS. 2-6 and includes a housing 66 located in a bearing sump 68 of a gas turbine engine around a rotor shaft 70 of the latter. The housing has a wide, U-shaped lower part 72 near a first rotor shaft bearing 74, a relatively narrower inverted U-shaped upper part 76 between the first bearing 74 and a power take-off 78, and a cover 80 which closes an open side 82 of the housing. A circular opening 84 for the rotor shaft 70 is defined between the upper and lower parts 76,72. A plurality of mounting bosses 86 are defined on the housing and have a corresponding plurality of threaded holes 88 therein for bolting the housing to a structural portion, not shown, of the engine. The secondary oil system 10' sustains a second rotor shaft bearing 90 if the primary oil system of the engine becomes inactive while the engine is operating.

A secondary oil reservoir or chamber 92 is defined in the housing 66 between the cover 80 and a wall 94 of the housing. A first valve boss 96, FIG. 4, on the wall;94 projects into the reservoir 92 and has a bore 98 therein which slidably receives a check valve spool, not shown. The check valve spool has an open position wherein an orifice, not shown, corresponding to the inlet orifice 64 in secondary oil system 10 described above is open and a closed position wherein the inlet orifice is blocked.

An oil-in port 100 in the wall 94 of the housing 66 is connected through internal passages, not shown, in the housing to the bore 98 in the first valve boss 96. The oil-in port 100 is also connected by piping, not shown, to the primary oil system of the engine such that whenever the primary system is active, oil at primary system pressure biases the check valve spool in the bore 98 to its open position and fills the secondary oil reservoir 92 through the orifice in the first valve boss. Excess primary system oil returns to the primary oil system through an oil-out port 102, FIG. 3.

Figure 4:
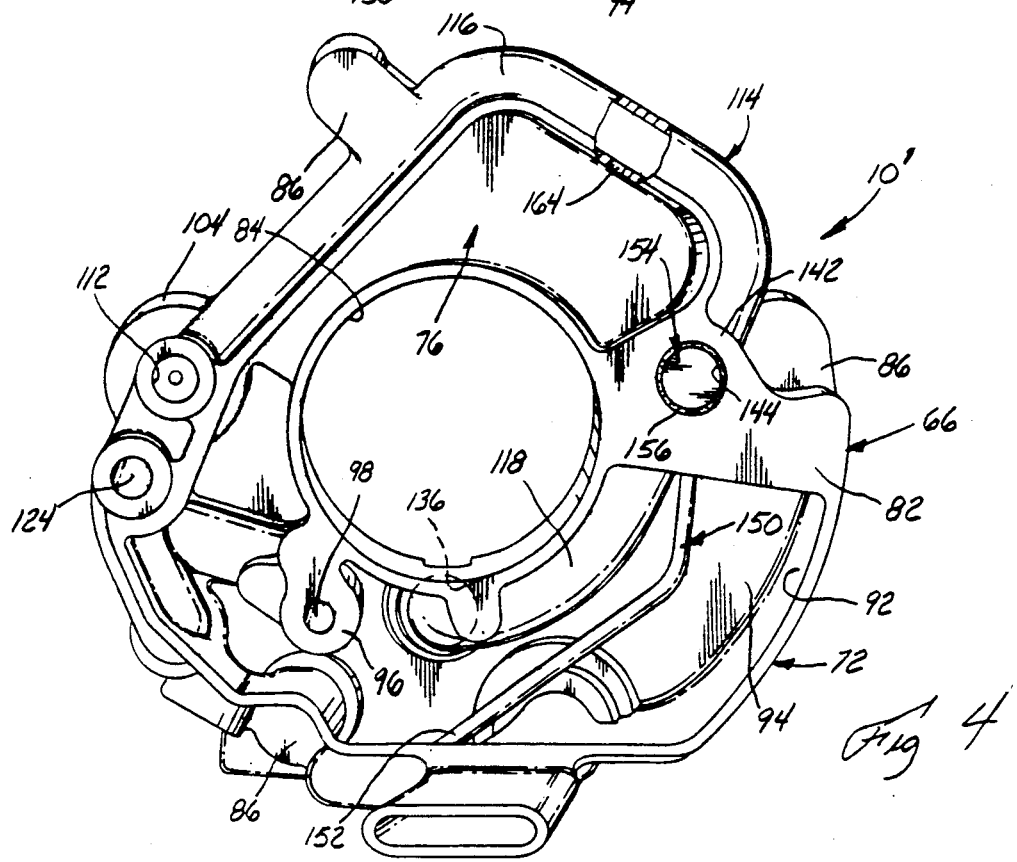
FIG. 4 is a partially broken-away perspective view of a second side of a secondary oil system according to this invention.
Figure 5:
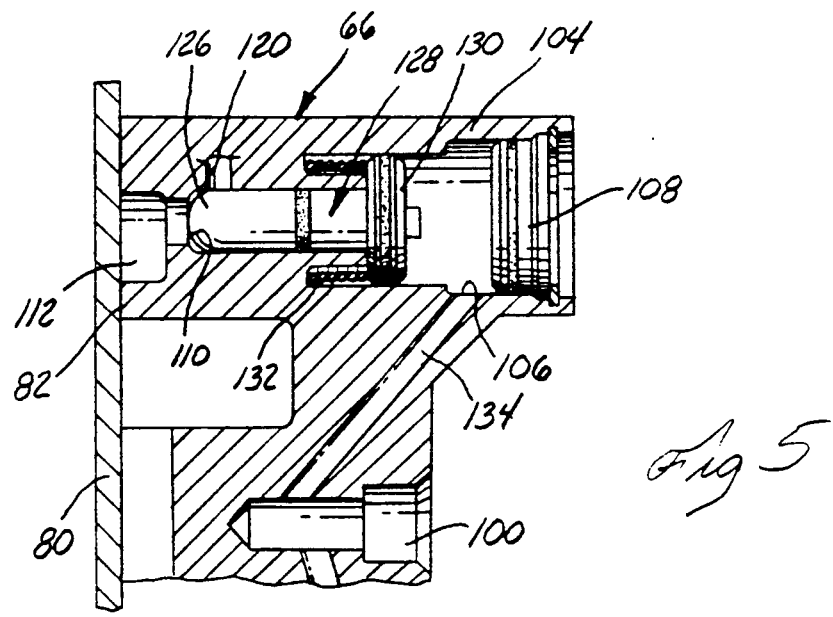
FIG. 5 is a sectional view taken generally along the plane indicated by lines 5—5 in FIG. 3.

As seen best in FIGS. 3-5, a second valve boss 104 on the housing 66 has a stepped bore 106 therein closed at one end by a plug 108. A seat 110 at the other end of the stepped bore separates the stepped bore from an inlet chamber 112 to a mist tube 114. The mist tube is cast integrally into the housing 66 and includes an arch 116 over the upper part 76 of the housing, FIGS. 3-4, and a lower extension 118, FIG. 4, behind the wall 94.

A partially illustrated internal passage 120 in the lower part 72 intersects the small end of the stepped bore 106 on the other side of the seat 110 from the inlet chamber 112. The passage 120 connects the small end of the stepped bore 106 to an air-in port 122, FIG. 3, on the housing 66 which is connected by piping, not shown, to the compressor of the engine so that the passage 120 is supplied with compressed air whenever the engine is in operation. An air-out port 124, FIG. 4, on the housing is connected to the air-in port and to additional piping, not shown, for conducting compressed air to other locations in the engine.

A stem 126 of a shut-off valve 128 is slidably disposed in the small end of the stepped bore 106 and a piston 130 integral with the stem 126 is slidably disposed in the big end of the stepped bore. The shut-off valve has a closed position, FIG. 5, in which the stem is seated on the seat 110 and an open position, not shown, off the seat in which the passage 120 communicates with the inlet chamber 112. The shut-off valve is biased to its open position by a spring 132 and is urged to its closed position by oil at primary system pressure introduced into the big end of the stepped bore 106 outboard of the piston 130 through a passage 134 in the housing 66 connected to the oil-in port 100.

Figure 6:
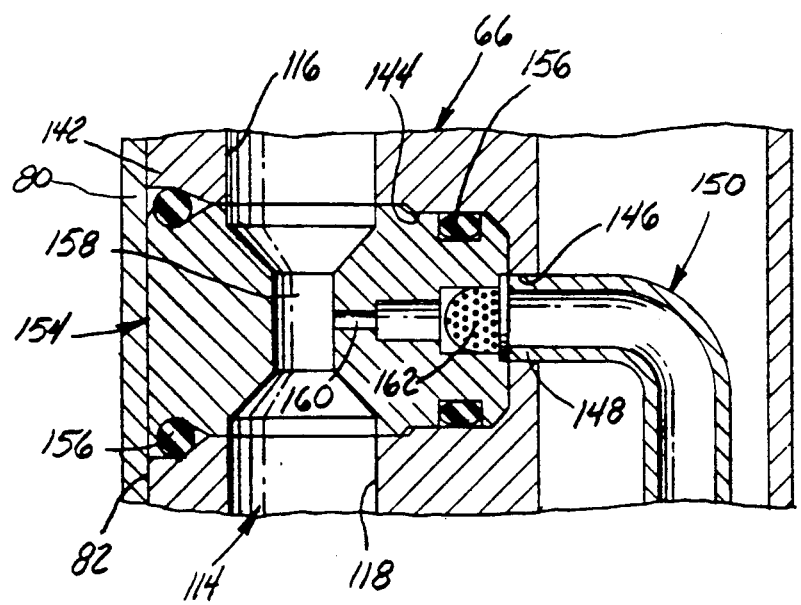
FIG. 6 is a sectional view taken generally along the plane indicated by lines 6—6 in FIG. 3.

As seen best in FIGS. 3, 4 and 6, a mist-out port 136 in a depression in the wall 94 of the housing 66 defines the opposite terminal end of the mist tube 114 from the inlet chamber 112. A schematically illustrated manifold 138, FIG. 2, is connected to the mist-out port 136 and terminates at a representative secondary oil system nozzle 140 aimed at the second bearing 90.

Between the arch 116 and the lower extension 118 of the mist tube 114, the latter traverses vertically a third boss 142 on the housing 66. A bore 144 extends into the third boss 142 from the open side of the housing and intersects the mist tube 114 between the arch 116 and the lower extension 118. The bore 144 is further intersected by an aperture 146, FIG. 6, in which is fitted an upper end 148 of a pick-up tube 150. A lower end 152, FIG. 3, of the pick-up tube is located in the reservoir 92 near the bottom thereof.

An insert 154 is mounted in the bore 144 with a pair of seals 156 on opposite sides of the mist tube. The insert has a small diameter throat which defines a venturi passage 158 in the mist tube. A first orifice 160 in the insert 154 connects the venturi passage 158 and the aperture 144 so that the pick-up tube communicates with the mist tube at the venturi passage. A strainer 162 on the insert 154 prevents contamination of the first orifice 160.

As seen best in FIGS. 3-4, a second orifice 164 is defined in the mist tube 114 on the opposite side of the arch 116 from the inlet chamber 112. The second orifice opens into the reservoir 92 between the wall 94 and the cover 80. The second orifice 164 is at a higher elevation than the first orifice 160 relative to the bottom of the reservoir.

In operation, when the gas turbine engine is operating normally, oil at primary system pressure holds the shut-off valve 128 in its closed position preventing compressed air from entering the mist tube inlet chamber 112. Concurrently, oil at primary system pressure holds the check valve spool in the bore 98 in its open position so that oil from the primary system fills the secondary oil reservoir 92. The oil level in the reservoir 92 rises until it achieves the level of the first orifice 160. Then, oil then spills out of the first orifice 160 into the lower extension 118 of the mist tube and out of the mist-out port 136 because the latter is at a lower elevation than the first orifice. The spill-over drips into the sump 68 from the secondary oil system nozzle at the end of the manifold 138 and is scavenged from the sump in the usual manner. The elevation of the first orifice, therefore, defines the normal oil level in the secondary oil reservoir 92.

If oil pressure in the primary oil system becomes abnormally low, for example when the integrity of the primary oil system is breached, the spring 132 shifts the shut-off valve to its open position admitting compressed air to the inlet chamber 112 and to the mist tube 114. The compressed air flows in the mist tube to the venturi passage 158 and through the second orifice 164 into the reservoir 92 above the oil level therein. The compressed air pressurizes the reservoir so that a pressure gradient develops across the check valve spool in the bore 98 which shifts the spool to its closed position preventing backflow of oil out of the reservoir into the primary oil system. The air pressure on the oil in the reservoir also forces oil up the pick-up tube 150 and through the first orifice 160 into the venturi passage 158.

The oil issuing from the first orifice 160 mixes with high velocity air in the venturi passage 158 and to form a mist which is transported by the lower extension 118 of the mist tube to the mist-out port 136 and into the manifold 138. The secondary oil system nozzle 140 directs the mist onto the second bearing 90 for sustaining operation of the latter until the supply of oil in the reservoir 92 is depleted.

I claim:

1. In a gas turbine engine having
a source of compressed air,
a rotor bearing in a bearing sump of said engine, and
a primary oil system for lubricating said rotor bearing with oil at a primary oil system pressure when said engine is operating normally,
a secondary oil system comprising:
a reservoir in said bearing sump,
means defining an oil inlet between said primary oil system and said reservoir for filling said reservoir with oil from said primary oil system,
a mist tube in said reservoir having a first end connected to said compressed air source and a second end connected to a secondary oil system nozzle in said bearing sump,
means defining a first orifice in said mist tube at a first elevation relative to the bottom of said reservoir and above the elevation of said secondary oil system nozzle relative to the bottom of said reservoir,
means defining a pick-up tube for conducting oil from said reservoir near said bottom thereof to said first orifice,
a shut-off valve means in said mist tube between said first orifice and said first end of said mist tube responsive to said primary system oil pressure to block said mist tube when said primary system oil pressure is above a predetermined magnitude and to unblock said mist tube when said primary system oil pressure is below said predetermined magnitude thereby to initiate compressed air flow in said mist tube when said primary system oil pressure is below said predetermined magnitude,
means defining a second orifice in said mist tube open to said reservoir at a second elevation relative to the bottom of said reservoir exceeding said first elevation and between said first orifice and said shut-off valve means so that said reservoir is pressurized with compressed air through said second orifice when said mist tube is open, and
means in said mist tube at said first orifice operative to mix oil issuing from said first orifice with compressed air in said mist tube when said mist tube is open to create an air and oil mist for transport by said mist tube from said first orifice to said secondary oil system nozzle.

2. The secondary oil system recited in claim 1 wherein said means in said mist tube at said first orifice operative to mix oil from said first orifice with compressed air in said mist tube includes
means in said mist tube defining a venturi passage having a minimum area throat into which said first orifice opens.

3. The secondary oil system recited in claim 2 wherein said oil inlet means between said reservoir and said primary oil system includes
an inlet orifice between said primary oil system and said reservoir,
a check valve supported on said reservoir for movement between an open position exposing said inlet orifice and a closed position closing said inlet orifice, and
means for exposing a first side of said check valve to said primary oil system pressure and a second side of said check valve to pressure in said reservoir so that said check valve is biased to said open position when said primary system oil pressure is above said predetermined magnitude and is biased to said closed position when said primary system oil pressure is below said predetermined magnitude.

4. The secondary oil system recited in claim 3 wherein said shut-off valve means includes
means on said reservoir defining a housing having a valve bore therein,
means on said housing defining a valve seat one side of which is connected to said mist tube and said other side of which is connected to said compressed air source,
a shut-off valve supported in said valve bore for movement between a closed position seated on said valve seat and blocking communication between said mist tube and said compressed air source and an open position removed from said valve seat and permitting communication between said mist tube and said compressed air source, spring means biasing said shut-off valve to said open position, and means defining a primary system oil pressure chamber exposed to said shut-off valve and connected to said primary oil system so that said primary system oil pressure maintains said shut-off valve in said closed position when said primary system oil pressure is above said predetermined magnitude.

* * * * *